Jan. 25, 1944.  W. G. GRIMES  2,340,053
INDICATOR LIGHT
Filed Dec. 11, 1942
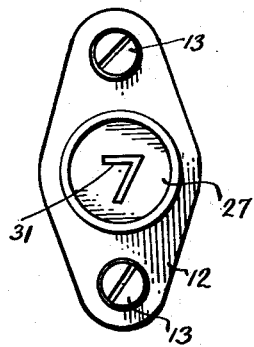
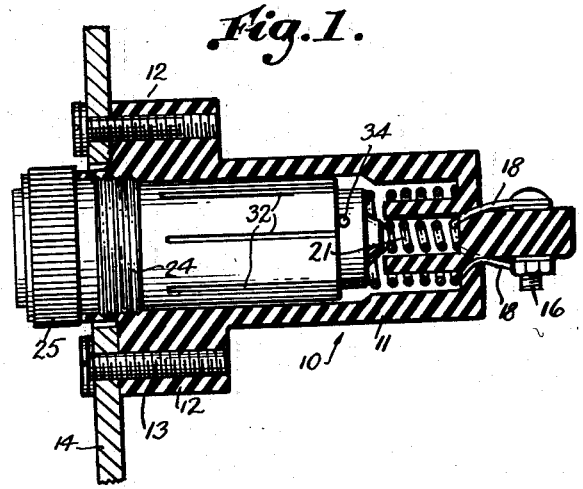
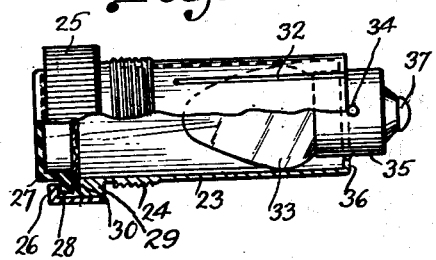
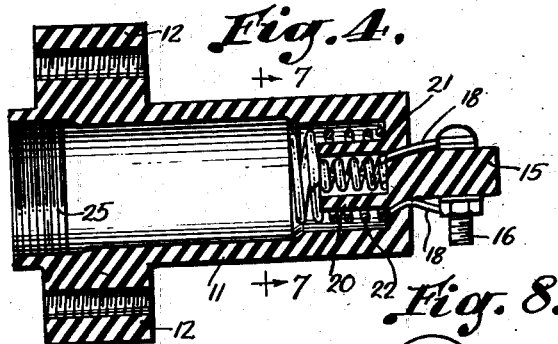
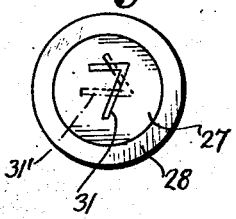
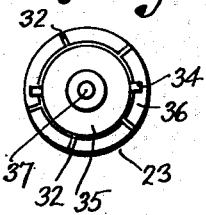
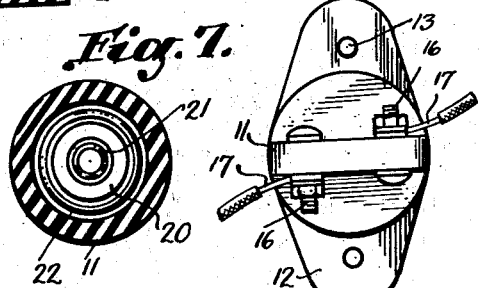
INVENTOR.
WARREN G. GRIMES.
BY Miller & Miller
ATTORNEYS.

Patented Jan. 25, 1944

2,340,053

UNITED STATES PATENT OFFICE 2,340,053

INDICATOR LIGHT

Warren G. Grimes, Urbana, Ohio

Application December 11, 1942, Serial No. 468,709

4 Claims. (Cl. 177—329)

This invention relates to an indicator light and has for an object to provide a small indicator light and assembly particularly useful in various locations on aircraft.

It is a further object of this invention to provide an indicator light of small size and very light weight which utilizes a small concentric contact lamp and occupies such a small space that it may be placed in any desired location and as many as necessary may be used, without causing any appreciable increase in the weight of the aircraft.

Aircraft, nowadays, are getting to be quite large affairs and it is impossible for the various operators to mentally remember all the acts that have been, or are to be performed during the operation of the aircraft. For instance, in a bomber carrying a large number of bombs, it is desirable that the pilot know just which bombs are still to be released and which bomb racks have already been emptied. It is an object of this invention to provide a light weight indicator that may be connected up to the bomb release so that it will indicate positively by being lighted up that there is a bomb still available in a particular rack, and further by carrying an indicia in connection with the light it will indicate which particular bomb, or rather which particular rack is still occupied by a bomb.

Many other purposes for this indicator light are apparent, for instance, it may be used to indicate whether the bomb doors are open or closed or to indicate when any structure is in one of two possible positions.

With the foregoing and other objects in view as will hereinafter become apparent, this invention includes the combinations, constructions and arrangements of parts hereinafter set forth, disclosed, and illustrated on the accompanying drawing, wherein:

Figure 1 is a partly sectional and partly elevational view of the indicator light assembly of this invention.

Fig. 2 is an elevational view of the indicator in the position visible to the operator.

Fig. 3 is a partly elevational and partly sectional view of the lamp, socket and indicator.

Fig. 4 is a sectional view of the assembly housing and contacts.

Fig. 5 is an elevational view looking at the left end of Fig. 3.

Fig. 6 is an elevational view looking at the right end of Fig. 3.

Fig. 7 is a sectional view on the line 7—7 of Fig. 4, and

Fig. 8 is an elevational view looking at the left end of Fig. 4.

There is shown at 10 the indicator light and assembly of this invention. This includes a housing 11 provided with a pair of oppositely extending wings 12 suitably apertured and threaded to receive stud bolts 13 for securing the same through any suitable supporting panel 14. At the other end of this housing 11 there is provided an extending flattened ear 15 through which extend contact bolts 16 for securing conductors 17 leading to the structure whose alternative positions are to be indicated. These contact bolts 16 also have contact wires 18 secured thereto and extending into the inside of the housing 11. At this end of the housing 11 the inside is provided with a counter-bored well 20 having a small coil spring 21 inside the hollow of the well 20 and a large coil spring 22 in the annulus surrounding the well 20, each of these coil springs 21 and 22 being connected to one of the contact wires 18.

Adapted to be extended into the housing 11 is an expansible sleeve-type lamp socket 23 which is provided with a threaded neck 24 for cooperation with a threaded throat 25 at the open end of the housing 11 so as to secure the socket 23 within the housing 11. In order to provide for easy assembly of the socket in the housing, a knurled annulus 25 is secured over the shoulder 29 formed by the end of the socket 23. This knurled annulus 25 is provided with an inwardly extending flange 26 which serves to hold an indicator button 27 in position thereon, this indicator button 27 being provided with an extending shoulder 28 adapted to fit between the flange 26 and against the shoulder 29 formed by the end of the wall of the socket 23, a friction washer 30 being provided between the shoulder 29 formed by the end of the socket wall and the bottom of the button shoulder 28 so as to permit the button 27 to be rotated by the pressure of a thumb, for instance, and bring the indicia 31 thereon from any improper position 31' to an easily readable position such as shown at 31, it being realized that when the lamp socket 23 has been threaded into position, the indicia 31 thereon might be found in any position of rotation, but with this structure it may easily be placed in a proper readable position.

The socket shell 23 is provided with an odd number of longitudinal slits 32 at the open end thereof through which the lamp 33 is inserted until the pins 34 on the lamp base 35 abut against the flange 36 on the end of the shell 23. The button 27 is made of a suitable transluscent material such as plastic or the like which is covered with black paint or other opaque material in such a manner as to leave the indicia 31 visible when the lamp 33 is lighted. As will be observed, the indicia 31 herein shown is a numeral, but it will be apparent that any other numeral, letter of the alphabet, or other type of indicia may be used and will be used on additional units of this invention.

In operation, the lamp 33 is inserted in the socket 23 until the pins 34 abut against the socket flange 36. Due to the presence of the slits 32 the end of the socket opens up somewhat and permits the lamp 33 to enter therein and then closes over to hold the lamp in position therein with the pins 34 abutting against the flange 36. Due to the fact that there are an even number of pins 34 and an odd number of slits 32, it is impossible for the pins and slits to accidentally line up and permit the lamp to enter the socket any further than the exact desired amount. With the lamp thus placed in position in the socket, the socket is then inserted into the housing 11. The relative size of the housing 11 and the socket and lamp as thus assembled is such that when the threads 24 of the socket are placed completely into position in the threaded throat 25 of the housing 11, the center contact 37 of the lamp 33 will abut against the coil spring 21 within the well 20 while the lamp base concentric contact 35 will abut against the larger coil spring 22 in the hollow annulus surrounding the well 20, thus making it possible to complete the circuit to the lamp 33 and wires 18 through bolts 16 to conductors 17 connecting with the structure, whose condition is to be indicated. It is thus possible to use a very small size concentric contact lamp in a location where it is impossible to normally ground the lamp base in the usual manner, thus making it possible for the lamp indicator of this invention to be placed in any desirable location whatsoever.

While the device has been shown and the structure described in detail, it is obvious that this invention is not to be considered limited to the exact form disclosed, and that changes may be made therein within the scope of what is claimed without departing from the spirit of the invention.

Having thus set forth and disclosed the nature of this invention, what is claimed is:

1. An indicator light comprising a cylindrical housing closed at one end, a pair of spaced concentric contact springs mounted at the closed end of said housing, an expansible sleeve-type lamp socket insertible into said housing, a pair of correspondingly spaced concentric contacts on said concentric contact lamp a concentric contact lamp carried by said socket adapted to be held against said concentric contact springs to complete a circuit therethrough, a translucent indicator button, and means for mounting said button at the end of said lamp socket over the lamp.

2. An indicator light comprising a cylindrical housing closed at one end, a pair of spaced concentric contact springs mounted at the closed end of said housing, an expansible sleeve-type lamp socket insertible into said housing, a concentric contact lamp carried by said socket, a pair of correspondingly spaced concentric contacts on said concentric contact lamp adapted to be held against said concentric contact springs to complete a circuit therethrough, said lamp socket being divided by an odd number of longitudinal slits to permit the socket to spring open and permit the entry of the lamp therein, said lamp being provided with an even number of pins on the lamp base so angularly disposed that the lamp base pins cannot align with the slits and permit accidental entry of the pins into the slits, a translucent indicator button, and means for mounting said button at the end of said lamp socket over the lamp.

3. An indicator light comprising a cylindrical housing closed at one end, a pair of spaced concentric contact springs mounted at the closed end of said housing, an expansible sleeve-type lamp socket insertible into said housing, a concentric contact lamp carried by said socket, a pair of correspondingly spaced concentric contacts on said concentric contact lamp adapted to be held against said concentric contact springs to complete a circuit therethrough, said lamp socket being provided with a plurality of slits permitting said socket to yieldably open and receive the lamp therewithin, the base of the lamp being provided with a plurality of pins so angularly disposed relative to the slits that the pins cannot align with the slits but will abut against the end of the lamp socket to hold the lamp in proper relation thereto, a translucent indicator button, and means for mounting said button at the end of said lamp socket over the lamp.

4. An indicator light comprising a cylindrical housing, a lamp socket insertible into said housing, a lamp carried by said socket, a translucent indicator button, and means for mounting said indicator button at the end of said lamp socket over the lamp, said button mounting means comprising an inturned flange extending over said button, a shoulder on said socket within said inturned flange and a friction member between said button and said shoulder permitting said button to be rotated to and held in a desired angular position.

WARREN G. GRIMES.